United States Patent
Fernández Gutiérrez (10) Patent No.: US 8,218,484 B2
(45) Date of Patent: Jul. 10, 2012

(54) METHODS AND APPARATUS FOR SENDING DATA PACKETS TO AND FROM MOBILE NODES IN A DATA NETWORK

(75) Inventor: Álvaro Fernández Gutiérrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 472 days.

(21) Appl. No.: 12/594,175

(22) PCT Filed: May 29, 2009

(86) PCT No.: PCT/EP2009/056630
§ 371 (c)(1), (2), (4) Date: Sep. 30, 2009

(87) PCT Pub. No.: WO2009/147097
PCT Pub. Date: Dec. 10, 2009

(65) Prior Publication Data
US 2010/0303006 A1    Dec. 2, 2010

(30) Foreign Application Priority Data
Jun. 2, 2008 (ES) ................... 200801653

(51) Int. Cl.
*H04W 4/00* (2009.01)
(52) U.S. Cl. ...................................... 370/328
(58) Field of Classification Search ................... 370/328
See application file for complete search history.

(56) References Cited

U.S. PATENT DOCUMENTS

| | | | |
|---|---|---|---|
| 2003/0174688 A1* | 9/2003 | Ahmed et al. | 370/349 |
| 2006/0140196 A1 | 6/2006 | Tanaka et al. | |
| 2006/0146752 A1* | 7/2006 | Jang et al. | 370/331 |
| 2007/0177550 A1* | 8/2007 | Kwon et al. | 370/331 |
| 2010/0215019 A1* | 8/2010 | Velev et al. | 370/331 |

FOREIGN PATENT DOCUMENTS
EP   1562340 A1   8/2005

OTHER PUBLICATIONS

Perkins, C., IP Mobility Support for IPv4, IETF (Internet Engineering Task Force), Aug. 2002, The Internet Society, (http://www.ietf.org./rfc/rfc3344.txt).

(Continued)

*Primary Examiner* — Kenny Lin
(74) *Attorney, Agent, or Firm* — Gary R. Maze; K Kalan; Berenbaum Weinshienk PC (57) ABSTRACT

Methods for transmitting packets using a Mobile IP protocol between a mobile node and a first node in a data network after the mobile node has transmitted data packets to the first node via a first router from a first CoA or CCoA address and by a first security association with the first node. One method includes the mobile node, sending to the first node via a second router using a second CoA or CCoA address, data packets that include an identifier of the mobile node that enables the first node to identify the mobile node as the sender of the data packets during an initial time period after transmission of the data packets via the second router has started, and during the initial time period, the mobile node authenticates the data packets it transmits to the first node using the first security association with the first node.

21 Claims, 8 Drawing Sheets

OTHER PUBLICATIONS

Johnson, D. et al., Mobility Support in IPv6, IETF (Internet Engineering Task Force), Jun. 2004, The Internet Society (http://www.ietf.org/rfc/rfc3775.txt).
Perkins, C., IP Encapsulation Within IP, IETF (Internet Engineering Task Force), Oct. 1996, The Internet Society (http://www.ietf.org/rfc/rfc2003.txt).
Montenegro, G., Reverse Tunneling for Mobile IP, IETF (Internet Engineering Task Force), Jan. 2001, The Internet Society (http://www.ietf.org/rfc/rfc3024.txt).
Arkko, J. et al., Using IPsec to Protect Mobile IPv6 Signaling Between Mobile Nodes and Home Agents, IETF (Internet Engineering Task Force), Jun. 2004, The Internet Society (http://www.ietf.org/rfc/rfc3776.txt).
Kent, S. et al., Security Architecture for the Internet Protocol, IETF (Internet Engineering Task Force), Dec. 2005, The Internet Society (http://www.ietf.org/rfc/rfc4301.txt).
Patel, A. et al., Authentication Protocol for Mobile IPv6, IETF (Internet Engineering Task Force), Jan. 2006, The Internet Society (http://www.ietf.org/rc/rfc4285.txt).
Devarapalli, V. et al., Mobile IPv6 Operation with IKEv2 and the Revised IPsec Architecture, IETF (Internet Engineering Task Force), Apr. 2007, The Internet Society (http://www.ietf.org/rfc/rfc4877).
Rigney, C. et al., Remote Authentication Dial in User Service (RADIUS), IETF (Internet Engineering Task Force), Jun. 2000, The Internet Society (htpp://www.ietf.org/rfc/rfc2865.txt).
Calhoun, P. et al., Diameter Base Protocol, IETF (Internet Engineering Task Force), Sep. 2003, The Internet Society (http://www.ietf.org/rfc/rfc3588.txt).
Perkins, C. et al., Authentication, Authorization, and Accounting (AAA) Registration Keys for Mobile IPv4, IETF (Internet Engineering Task Force),Mar. 2005, The Internet Society (http://www.ietf.org/rfc/rfc3957.txt).
Koodli, R., Fast Handover for Mobile IPv6, IETF (Internet Engineering Task Force), Jul. 2005, The Internet Society (htttp://www.ietf.org/rfc/rfc4068.txt).
Soliman, H. et al., Hierarchical Mobile IPv6 Mobility Management (HMIPv6), IETF (Internet Engineering Task Force), Aug. 2005, The Internet Society (http://www.ietforg/rfc/rfc4140.txt).
Maughan, D. et al., Internet Security Association and Key Management Protocol (ISAKMP), IETF (Internet Engineering Task Force), Nov. 1998, The Internet Society (http://www.ietf.org/rfc/rfc2408.txt).
Aboba, B., et al. Extensible Authentication Protocol (EAP), IETF (Internet Engineering Task Force), Jun. 2004, The Internet Society (http://www.ietf.org/rfc/rfc3748.txt).
Soliman, H., Mobile IPv6 Support for Dual Stack Hosts and Routers (DSMIPv6), IETF (Internet Engineering Task Force), Nov. 2007, The Internet Society (http://tools.ietf.org/html/draft-ietf-mip6-nemo-v4traversal-06.txt).
Aboba, B. et al., The Network Access Identifier (NAI), IETF (Internet Engineering Task Force), Dec. 2005, The Internet Society (http://www.ietf.org/rfc/rfc4282.txt).
Thomson, S. et al., IPv6 Stateless Address Autoconfiguration, IETF (Internet Engineering Task Force), Sep. 2007, The Internet Society (http://www.ietf.org/rfc/rfc4862.txt).
Kent, S., IP Authentication Header, IETF (Internet Engineering Task Force), Dec. 2005, The Internet Society (http://www.ietf.org/rfc/rfc4302.txt).
Srisuresh, P. et al., Traditional IP Network Address Translator (Traditional NAT), IETF (Internet Engineering Task Force), Jan. 2001, The Internet Society (http://www.ietf.org/rfc/rfc3022.txt).
European Patent Office, Notification of Transmittal of the International Search Report and the Written Opinion of the International Searching Authority, or the Declaration for International Application No. PCT/EP2009/056630, Sep. 16, 2009.
European Patent Office, Invitation to Pay Additional Fees and, Where Applicable, Protest Fee for International Application No. PCT/EP2009/057309, Sep. 23, 2009.
Sun, Y.S. et al., Fast and Secure Universal Roaming Service for Mobile Internet, 2005, IEEE Communications Society, IEEE Globecom.
Chown, T. et al., Things to Think About When Renumbering an IPv6 Network, 2004, The Internet Society (draft-chown-v6ops-renumber-thinkabout-00).
Huawei, B.L. et al., IPv6 VPN Based Address Format, 2005, The Internet Society (draft-lee-13vpn-ipv6-vpn.txt).
Wasserman, M., An Analysis of Centrally Assigned Unique Local Addresses, 2007, The IETF Trust (draft-mrw-6man-ulac-analysis-01.txt).
Faccin, S.M., Dynamic Diffie Hellman Based Key Distribution for Mobile IPv6, 2001 (draft-le-mobileip-dh-01.txt).

* cited by examiner

METHODS AND APPARATUS FOR SENDING DATA PACKETS TO AND FROM MOBILE NODES IN A DATA NETWORK

FIELD OF THE INVENTION

The invention relates to methods and apparatus used to transmit data packets between a mobile node and a second node within a data network.

BACKGROUND

'Mobile IP' is a set of IETF protocols that allows a mobile device that communicates using IP packets to move and use different routers in different data networks as it moves. The common term for referring to the mobile device is 'Mobile Node'.

The two main Mobile IP protocols currently in use are called 'Mobile IPv4' and 'Mobile IPv6', which use IPv4 and IPv6 type IP addresses, respectively.

The "IP Mobility Support for IPv4" protocol (hereafter, "Mobile IPv4") is described in the RFC 3344 specifications (Request for Comments 3344), published online by the IETF (Internet Engineering Task Force), C. Perkins, August of 2002, currently available online at http://www.ietf.org./rfc/rfc3344.txt.

The "Mobility Support in IPv6" protocol (hereafter, "MIPv6" or "Mobile IPv6") is described in the RFC 3775 specifications, published online by the IETF, D. Johnson et al., June of 2004, currently available online at http://www.i-ett.org/rfc/rfc3775.txt A very brief explanation of a Mobile IP operation is described below.

A 'Mobile Node' can have two IP addresses: a permanent address called the 'Home Address', and a changeable address called the 'Care-of-Address' (CoA), which is an address associated with the network the Mobile Node is visiting at any given moment.

A device called 'Home Agent' stores the information from the Mobile Nodes whose permanent IP address belongs to the same network as the Home Agent. When the Mobile Node is on its permanent network, it does not need to use the mobility services.

When a node on the network, usually called the Correspondent Node, wants to send IP packets to a Mobile Node found on a remote network, it uses the Mobile Node's permanent address (i.e. the Home Address) to send the IP packets. These IP packets are intercepted by the Home Agent, which encapsulates the packets, adding a new IP header to them, and forwards them via a tunnel to the remote network's CoA address where the Mobile Node is located.

To encapsulate and send the packets via a tunnel, the Home Agent and the Mobile Node can use various protocols, including, for example, the "IP Encapsulation within IP" protocol, described in RFC 2003, published online by the IETF, Perkins et al., October of 2003, currently available online at http://www.ietf.org/rfc/rfc2003.txt.

In Mobile IPv4, a device called a 'Foreign Agent', which is a router that provides mobility services to the Mobile Node, can be used in the remote network. Foreign Agents do not exist in Mobile IPv6.

In Mobile IPv4, a Mobile Node can obtain its CoA IP in one of two ways. A first way is through a Foreign Agent. The CoA address obtained in this manner is called a 'Foreign Agent Care-of-Address' (Foreign Agent CoA). In this case, the Mobile Node IP address is a Foreign Agent IP address. Several Mobile Nodes can use the same Foreign Agent CoA. The Foreign Agent is the end of the tunnel. When the Foreign Agent receives an IP packet addressed to the Mobile Node, the Foreign Agent removes the encapsulation and delivers the original packet to the Mobile Node.

A second way a Mobile Node in Mobile IPv4 may obtain a CoA address does not include the use of a Foreign Agent. The Mobile Node can directly obtain an IP address on the remote network by using the Dynamic Host Configuration protocol (DHCP), for example, and associating this IP address to one of the Mobile Node network interfaces. Addresses obtained this way are called 'Co-located Care-of-Addresses' (CCoA). This method has the advantage of allowing the Mobile Node to operate without the need of a Foreign Agent. When it uses a CCoA, the Mobile Node is the end of the tunnel, and when it receives a packet from the Home Agent, it removes the encapsulation and recovers the original packet.

When a Mobile Node is located outside of its permanent network and wants to send IP packets to a Correspondent Node, the Mobile Node can do so in one of various ways, as described below.

One way, common to both Mobile IPv4 and Mobile IPv6, is to encapsulate the packets addressed to the Correspondent Node and send them first to the Home Agent via a tunnel, so that the Home Agent can send them to the Correspondent Node. The procedure is called Reverse Tunneling and its use in Mobile IPv4 is described in RFC 3024, G. Montenegro, January of 2001, currently available online at http://www.ietf.org/rfc/rfc3024.txt. Its use in Mobile IPv6 is described in section 11.3.1 of the RFC 3775 mentioned previously.

When the Mobile Node is located on a remote network, it can also send the IP packets directly to the Correspondent Node in different ways without passing through the Home Agent.

In Mobile IPv4, a Mobile Node can send IP packets directly to the Correspondent Node using the Home Address as the source address for those packets. This causes a problem with the routers on the data network that use ingress filtering, which checks to see whether the source address for the IP packets being transmitted corresponds to a correct IP address based on the network topology.

Mobile IPv6 allows a Mobile Node to send IPv6 packets directly to the Correspondent Node without them passing through the Home Agent, but only when the Mobile Node and the Correspondent Node have completed a registration process called 'binding'. In this case, it uses a process called 'Route Optimization', which avoids problems with routers that use ingress filtering. A detailed description is found in the RFC 3375 discussed previously.

One problem that Mobile IP has to deal with is security. There are numerous IETF documents that describe security protocols, many of which are interrelated.

The RFC 3776 specifications, titled, "Using IPsec to Protect Mobile IPv6 Signaling Between Mobile Nodes and Home Agents," describe the security mechanisms first recommended by the IEFT for use in Mobile IPv6. These are published online by the IETF, J. Arkko et al., June of 2004, and are currently available online at http://www.ietf.org/rfc/rfc3776.txt In 2005, the IETF updated the IPsec system architecture. The new architecture is described in the RFC 4301 specifications, published online by the IETF, S. Kent et al., December of 2005, currently available online at http://www.ietf.org/rfc/4301.txt.

Since IPsec implementation is complicated and generates some problems, the IEFT published a document in 2006 describing another, simpler authentication mechanism for Mobile IPv6, similar to the one used by Mobile IPv4. The document is titled, "Authentication Protocol for Mobile IPv6", described in the RFC 4285 specifications, published online by the IEFT, A. Patel et al., January of 2006, currently available online at http://www.ietf.org/rc/rfc4285.

There is also an update of RFC 3776, titled, "Mobile IPv6 Operation with IKEv2 and the revised IPsec architecture." This is RFC 4877, published online by the IETF, V. Devarapalli et al., April of 2007, currently available online at http://www.ietf.org/rfc/rfc4877.

Although Mobile IP protocol security is based on establishing a 'Security Association' between the Mobile Node and the Home Agent, the majority of telecommunications companies and Internet access providers use AAA (Authentication, Authorization and Accounting) infrastructures to manage their clients' access to the Internet. As a result, over the past few years, the Mobile IPv4 and Mobile IPv6 protocols have been modified so that they can operate with AAA servers to permit these servers to be in charge of managing the authentication, authorization and accounting of devices that use Mobile IPv4 and Mobile IPv6 protocols.

The IETF has described two AAA server protocols called RADIUS and DIAMETER.

RADIUS (Remote Authentication Dial In User Service) is explained in the RFC 2865 specifications, published online by the IETF, C. Rigney et al., June of 2000, currently available online at htpp://www.ietf.org/rfc/rfc2865.txt.

DIAMETER is explained in the RFC 3588 specifications, published online by the IETF, P. Calhoun et al., September of 2003, currently available online at http://www.ietf.org/rfc/rfc3588.txt.

The use of AAA servers with Mobile IPv4 is described in the RFC 3957 specifications, published online by the IETF, C. Perkins et al., March of 2005, currently available online at http://www.ietf.org/rfc/rfc3957.txt.

Another problem that needs to be solved by Mobile IP technology regards a process that occurs when a Mobile Node changes from one router to another. This process of changing between routers is called 'handover'. When a Mobile Node changes from a first to a second router, the change needs to be made as quickly as possible to avoid leaving the Mobile Node unable to send or receive IP packets for a period of time (e.g., a few seconds). A mechanism is also needed to prevent IP packets arriving at the first router from being lost when the Mobile Node is no longer connected to it. For example, in a Voice Over IP (VoIP) application, a few-second latency or delay in receiving and forwarding packets is unacceptable.

To solve the problems associated with the handover, the IETF has published two documents, each proposing different solutions. These documents are called FHMIPv6 and HMIPv6, and are cited below.

The document, titled, "Fast Handover for Mobile IPv6" (FHMIPv6), described in the RFC 4068 specifications, published online by the IETF, R. Koodli, July of 2005, is currently available online at htttp://www.ietf.org/rfc/rfc4068.txt.

The document, titled, "Hierarchical Mobile IPv6 Mobility Management" (HMIPv6) described in the RFC 4140 specifications, published online by the IETF, H. Soliman et al., August of 2005, is currently available online at http://www.ietf.org/rfc/rfc4140.txt.

However, these two solutions to the aforementioned latency problems generated during the handover process are only partial solutions, and problems with delays when a Mobile Node changes from one router to another still exist. The present invention allows the handover process to take place in an improved manner, reducing the latency in the process.

SUMMARY OF THE INVENTION

A primary purpose of this invention is to provide an improved communications system for data networks that contain mobile nodes.

In order to achieve this, methods have been developed for use in a data network to transmit data packets between a mobile node and a second node connected to the data network. The mobile node is connected to a first router and has a first security association with another node connected to the data network. As the result of a geographic location change, for example, the mobile node connects to a second router and begins transmitting data packets to the other node via the second router instead of the first router. During at least an initial time period after transmitting data packets via the second router, the data packets transmitted from the mobile node include first data that allows for the identification of the mobile node by the other node. In the same or alternative embodiment, the mobile node uses the first security association with the other node during the initial time period that allows the network node that receives the data packets to verify the source and integrity of the data packets in a secure manner.

In a preferred embodiment, the data packets are IP packets (Internet Protocol).

In another embodiment, the invention takes into account that the IP packets sent by the mobile node by way of the second router may be encapsulated in IP packets that use the Home Agent IP address as their destination IP address.

In a preferred embodiment, a Home Agent establishes an association between the IP address on the second router being used by the mobile node and the first data, which identifies the mobile node, and stores this association in the Home Agent's memory. The Home Agent then preferably sends the IP packets it receives (that are addressed to the mobile node), to the IP address of the second router that is being used by the mobile node.

In another embodiment, a Home Agent removes the encapsulation from the IP packets it receives from the mobile node, and forwards these IP packets, without the encapsulation, to the packet's final destination.

In another embodiment, the invention takes into account that the IP packets sent by the mobile node by way of the second router may be encapsulated in IP packets that use a Correspondent Node IP address as their destination IP address.

In another embodiment, a Correspondent Node preferably establishes an association between the IP address on the second router being used by the mobile node and the first data, which identifies the mobile node, and stores this association in the Correspondent Node's memory.

In another embodiment, a Correspondent Node sends the IP packets it wants to send to the mobile node to the IP address of the second router used by the mobile node.

In another embodiment, the invention takes into account that the data packets sent by the mobile node may have a first field that indicates that a second field in the data packets can be modified after the data packets are transmitted by the mobile node. The mobile node calculates the authentication for the data packets as if the second field value were a string of zeros. The IP packet recipient detects the first field, which indicates that a second field may have been modified, and checks the IP packets authentication as if the value in the second field were a string of zeros.

In accordance with one embodiment, a method for transmitting packets using a version or modification of IPv4 or IPv6 Mobile IP protocol between a mobile node and a first node in a data network after the mobile node has transmitted data packets to the first node via a first router from a first CoA or CCoA address and by a first security association with the first node, the method comprising the mobile node sending to the first node via a second router using a second CoA or CCoA address data packets that include an identifier of the mobile node that enables the first node to identify the mobile node as the sender of the data packets during an initial time period after transmission of the data packets via the second router has started; and during the initial time period, the mobile node authenticating the data packets it transmits to the first node using the first security association with the first node.

It is important to note that the present invention is applicable to a Mobile IP protocol other than IPv4 or IPv6.

In another embodiment the invention further comprises the mobile node concurrently registering with the first node the second CoA or CCoA address during the initial time period.

In another embodiment the invention further comprises the mobile node concurrently obtaining a new security association with the first node during the initial time period.

In another embodiment the invention further comprises the mobile node concurrently registering with the first node the second CoA or CCoA address and obtaining a new security association with the first node during the initial time period.

In alternative embodiments the first node is a Home Agent and/or a Correspondent Node of the mobile node.

In alternative embodiments the mobile node identifier is the Home Address of the mobile node or a Network Access Identifier of the mobile node or the Interface Identifier portion of a mobile node IP address.

In alternative embodiments the first security association is a Mobility Security Association and/or includes the use of a Binding Management Key.

In another embodiment the present invention makes use of an authentication protocol that works at the data link or level 2 layers to permit the mobile node to access the second router before the second CoA or CCoA address is authenticated with the second router. In one embodiment the authentication protocol is a version of the Extensible Authentication Protocol.

In accordance with one embodiment of the present invention, the first node terminates the transmission of data packets to the mobile node if the registration of the second CoA or CCoA address is not completed within the initial time period. In another embodiment, the first node reinitiates transmission of data packets to the mobile node when the registration of the second CoA or CCoA address is completed.

In alternative embodiments of the present invention the data packets sent by the mobile node through the second router are encapsulated in IP packets having the same destination IP address as the first node. In one embodiment, the first node is a Home Agent, the Home Agent removing the IP packet encapsulation and forwarding the IP packets without the encapsulation to a final packet destination.

In other embodiments of the present invention the first node establishes an association between the second CoA or CCoA address and the identifier of the mobile node and stores the association in a memory of the first node. This permits the first node to send data packets to the second CoA or CCoA address of the mobile node after it has established a relationship between the second CoA or CCoA and the identifier of the mobile node.

In yet another embodiment, the data packets sent by the mobile node include a first data field that indicates that a second data field in the data packet is modifiable after being sent by the mobile node, the mobile node authenticating the data packets as if the value of the second data field were a string of zeros. Another embodiment further includes the first node receiving the data packets and determining from the first data field that the second data field may have been modified and in response the first node authenticating the data packets as if the value of the second data field were a string of zeros.

BRIEF DESCRIPTION OF THE DRAWINGS

Preferred embodiments of the present disclosure are described herein with reference to the drawings wherein.

DETAILED DESCRIPTION

Improved methods of executing the handover process of switching a mobile node connection from one router to another in a data network are provided in such a way as to reduce the latency produced on level 3 of the OSI model (i.e. at the data network level).

The handover latency is the delay in the sending and receiving of IP packets affecting the Mobile Node during the handover process. This latency has various causes. There is a first latency at the data link level (level 2 of the OSI model) and a second latency at the network level, or level 3, where the IP protocol operates. The total latency is the sum of the level 2 latency plus the level 3 latency.

The level 3 latency itself has several causes. Among these are the need to: obtain a new IP address from the second router; check that no other node is using the new IP address on the second router; send a registration request for this new IP address to a Home Agent; wait for the Home Agent to authenticate the request; and wait for the Home Agent to send a response to the Mobile Node confirming that the Mobile Node can begin using the new IP address. The level 3 latency is therefore, in part, related to the registration or 'binding' process as well as to security.

Below, is briefly explained the concepts 'Security Association' (SA) and 'Mobile Security Association' (MSA), as well as how a new IP address is registered with a Home Agent.

A Security Association is an association that permits what is usually a unidirectional connection (simplex connection) between two devices. Security services can then be provided to the traffic being transported through this connection. To secure the traffic on a typical bidirectional connection, two SAs are usually needed (i.e. one SA for each direction). Using two SAs, two devices can communicate with each other in a bidirectional and secure way. It is stated that the connection is "usually" unidirectional because some special Mobility Security Association protocols are also bidirectional.

For the purpose of explanation, the accompanying figures show a Mobility Security Association that permits a bidirectional and secure communication with the use of a single MSA that has two ends.

Normally, the information that permits secure communications is stored on an SA. This information includes, for example, the length of the secret keys, the secret keys themselves, the cryptographic algorithms, the authentications mechanisms, the initialization vectors and any other piece of information that is necessary for secure communications between the two different devices. Sometimes the term SA is used to refer to the information that is stored on the different devices that use the SA and permits them to communicate in a secure manner. Nevertheless, the SA is the security association between the devices. The information that each device stores is only one of the possible ways to store the SA.

The SA can provide different kinds of security services like, for example, authentication or encryption, and can use various algorithms and security protocols found on the SA to do so. The SA also contains information about the keys that must be used for the secure connection like, for example, a shared key or a public key/private key pair and other necessary information for using the security services.

To establish an SA between several devices, different protocols can be used. These include, for example, the ISAKMP protocol (Internet Security Association and Key Management Protocol), described in the RFC 2408 specifications published online by the IETF, D. Maughan et al., November of 1998, currently available online at http://www.ietf.org/rfc/rfc2408.txt.

The devices that use SAs store them on a database called an SAD (SA Database). On the SAD database, each SA is associated with an identifier called a 'Security Parameter Index' (SPI) which allows it to be identified. In addition, each entry in the SAD database must indicate whether each SA should be used based on the IP packets' destination IP address or based on the packets' source and destination IP addresses.

The term MSA, or 'Mobility Security Association', is used in different IETF documents to refer to the SAs used by Mobile Nodes. For example, RFC 3957, which discusses Mobile IPv4 and AAA servers, defines a MSA as a unidirectional connection that allows for the use of security services with the Mobile IPv4 protocol, for traffic between the Mobile Node and the Home Agent, or for the traffic between the Mobile Node and the Foreign Agent. An MSA is defined based on the source and destination IP addresses and the SPI parameter.

Figure 1:
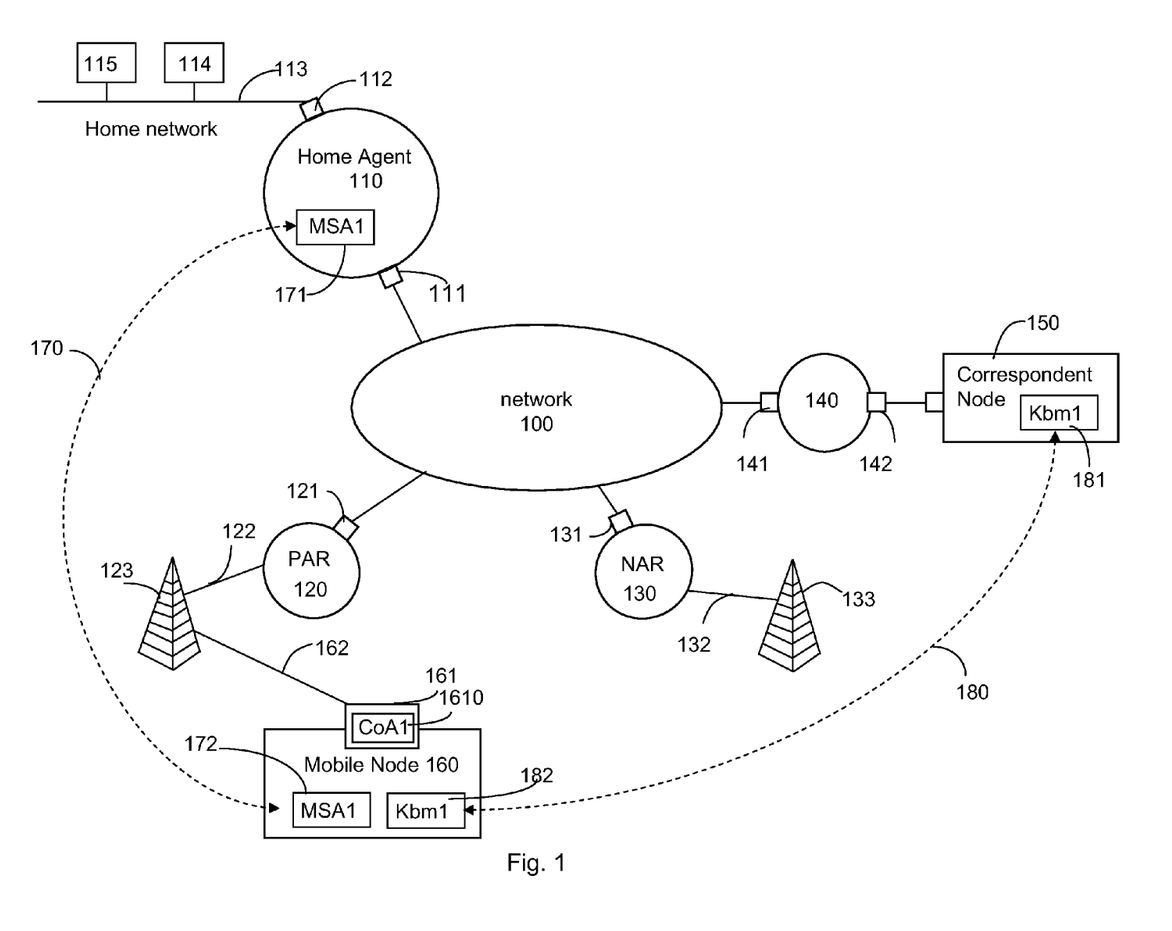
FIG. 1 shows a mobile node connected within a data network via a first router.

FIG. 1 shows a data network 100 connected to a router called Home Agent 110 and other routers 120, 130 and 140. The Home Agent 110 is connected to a home network 113 through network interface 112. Other nodes 114 and 115 may also be connected to the home network. All of these elements connected to the data network 100 can also be considered part of the data network. We will use the term "data network" to refer not only to the data network 100, but also to the network 100 together with all the other elements that send data packets using the network 100.

The router 120 is called PAR, an abbreviation of 'Previous Access Router'. The router 130 is called NAR, an abbreviation of 'Next Access Router'. These names are often used in Mobile IP protocols like, for example, the FHMIPv6 protocol mentioned above. The terms are used here for increased clarity.

The term Mobile Node is used to refer to the mobile nodes on the network as it is the accepted term used in all the RFCs discussed previously.

The Mobile Node 160 communicates wirelessly 162 through its network interface 161 with antenna 123, which is connected to router PAR 120. The IP address used by the Mobile Node is called CoA1, and is represented by the element 1610.

The Mobile Node registers the CoA1 address with the Home Agent 110 and has a Mobility Security Association, MSA1, with the Home Agent 110.

The MSA1 being shared by the Mobile Node and the Home Agent is represented in FIG. 1 by elements 170, 171 and 172. Element 171 represents the MSA1 information that is stored by the Home Agent 110. Element 172 represents the MSA1 information stored by the Mobile Node 160. The dotted line 170 indicates that the Home Agent and the Mobile Node can communicate securely thanks to the fact that they share an MSA1 security association. This same dotted line 170 indicates that there is an MSA security association between both ends of the MSA. As we explained previously, the MSA can actually be made up of two unidirectional MSAs but, for the sake of clarity, is represented in FIG. 1 by a single MSA.

Thanks to the MSA, the Home Agent 110 and the Mobile Node 160 can exchange secure messages (e.g., the CoA1 address registration message). The data that are transmitted between the Home Agent 110 and the Mobile Node 160 are transmitted via the router 120 and the data network 100.

The Mobile Node 160 can communicate with multiple nodes on the network by using Mobile IP protocols. Based on the terminology used in the Mobile IP protocol, these nodes have been named 'Correspondent Nodes'.

FIG. 1 shows a Correspondent Node 150 connected to the data network 100 via the router 140. The Mobile Node 160 and the Correspondent Node 150 can communicate with each other using the Mobile IP protocols. To do so, they can send the IP packets to each other in a variety of different ways. One way is to exchange IP packets via the Home Agent 110. A second way consists of having the Mobile Node 160 send IP packets directly to the Correspondent Node, which can also send IP packets directly to the Mobile Node.

Even though, for the sake of clarity, FIG. 1 shows only a single Correspondent Node 150, there can be many Correspondent Nodes communicating with the Mobile Node, be it directly or through the Home Agent 110.

Figure 2:
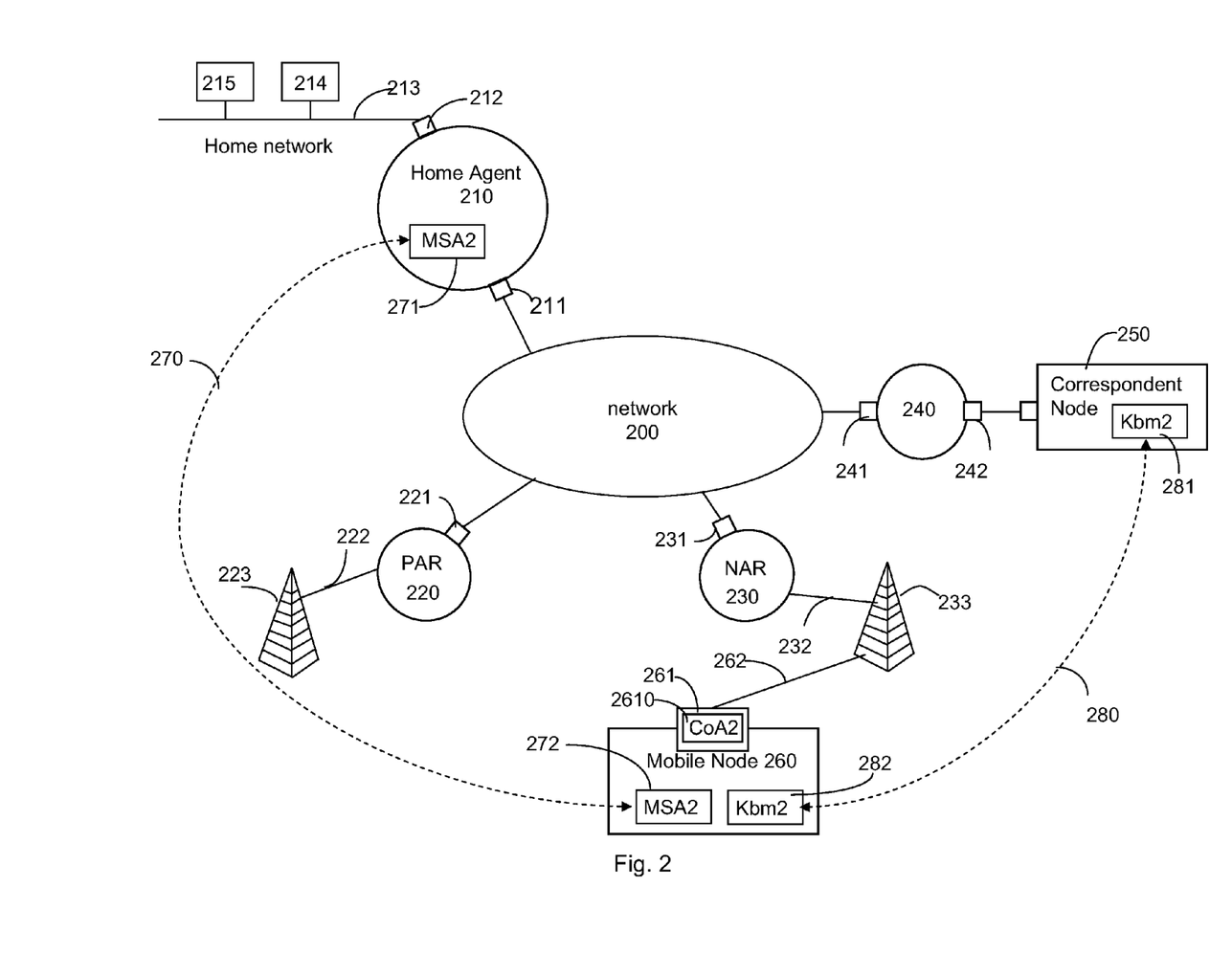
FIG. 2 shows the mobile node of FIG. 1 connected within the data network via a second router.
Figure 6:
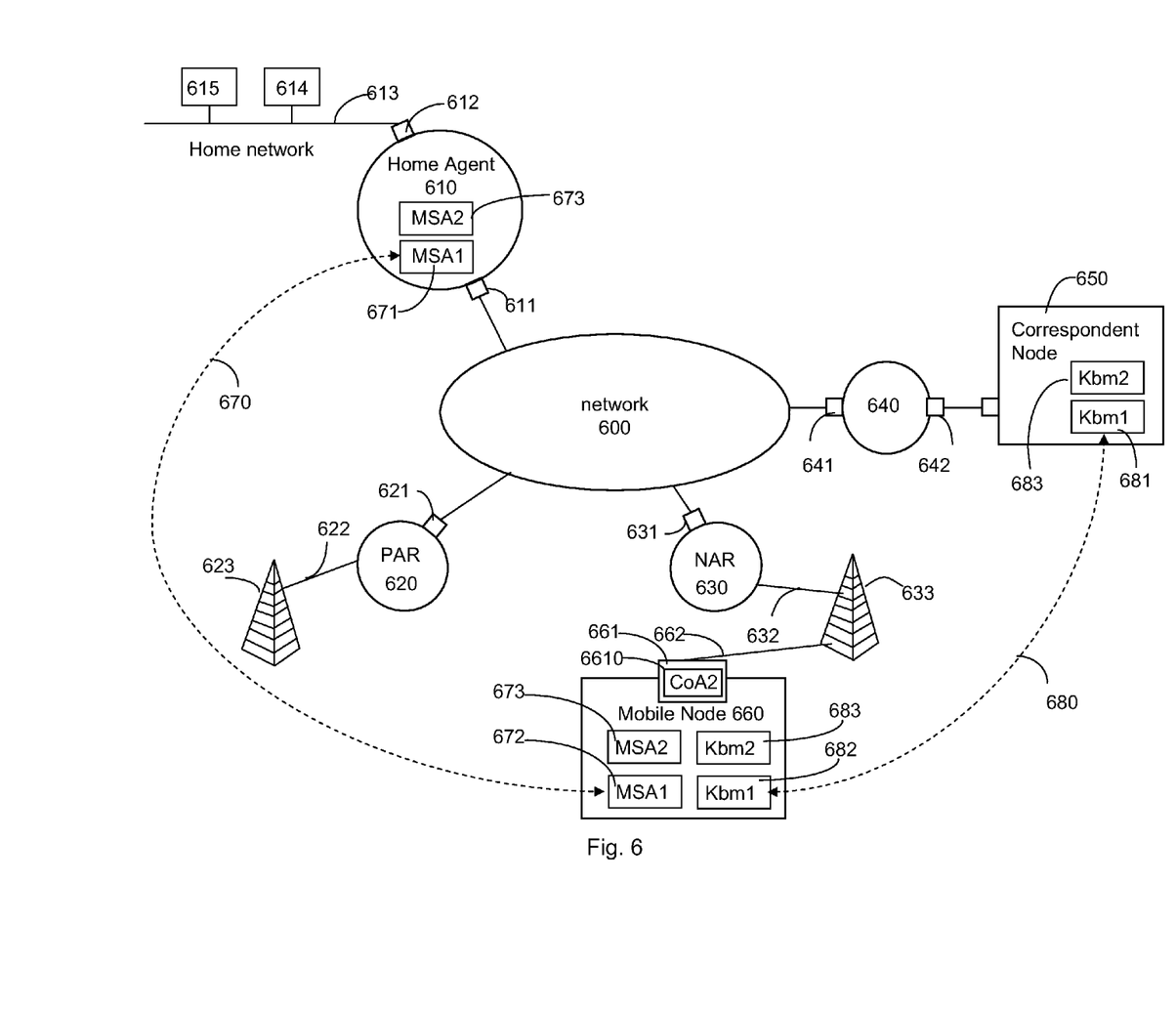
FIG. 6 illustrates an implementation of the present invention.

In the Mobile IPv6 protocol, the Mobile Node and the Correspondent Node can communicate with each other directly in a secure manner by using a key called a Kbm, or 'Binding Management Key', which they obtain by following the 'Return Routability' procedure, explained in section 5.2.5 of RFC 3775. In FIG. 1 we have shown this secret Kbm1 key, that can be shared by the Mobile Node 160 and the Correspondent Node 150, through the elements 180, 181 and 182. FIG. 2 illustrates a similar direct communication path with the use of elements 280, 281 and 282. Likewise, FIG. 6 illustrates a similar direct communication path with the use of elements 680, 681 and 682.

This shared Kbm1 key is not, strictly speaking, a Mobility Security Association, because the Return Routability procedure that is used to create it is less secure than the one used to create the MSA1. We will use the term "security association" to refer not only to the Mobility Security Associations (e.g., MSA1), but also to refer to these shared keys, (e.g., Kbm1).

FIG. 2 shows the previous Mobile Node after having completed the handover process to connect to router NAR 230. The Mobile Node 260 uses a new IP address 2610 called CoA2 and communicates wirelessly 262 through its network interface 261 with antenna 233, which is connected to router 230. The Mobile Node has registered the CoA2 on the Home Agent 210 and has a new Mobility Security Association, MSA2 271, represented by the dashed line 270. Thanks to the MSA2, the Mobile Node 260 and the Home Agent 210 can exchange secure messages.

In order to simplify the explanation, FIGS. 1 and 2 do not expressly show the Foreign Agent routers, which are only used in Mobile IPv4 protocols. The Foreign Agents can be included, for example, on antennas 123 and 133 (antennas 223 and 233 in FIG. 2 and antennas 623 and 633 in FIG. 6).

Below is a brief description of the process used to register a CoA address with the Home Agent. The registration messages are different for the Mobile IPv4 and Mobile IPv6 protocols. In the Mobile IPv4 protocol, the registration message for a new CoA address is called a 'Registration Request' (RRQ), and in the Mobile IPv6 protocol the registration message is called a 'Binding Update Message'.

In both the Mobile IPv4 and Mobile IPv6 protocols, a CoA's registration message containing the new CoA information is sent from the Mobile Node to the Home Agent and the Mobile Node waits for a response message from the Home Agent before starting to use the new CoA, that is, before starting to send IP packets to the possible Correspondent Nodes. The messages that are exchanged also include an electronic signature or "hash," so that the Home Agent as well as the Mobile Node can check the integrity of each message and authenticate the sender.

Figure 3:
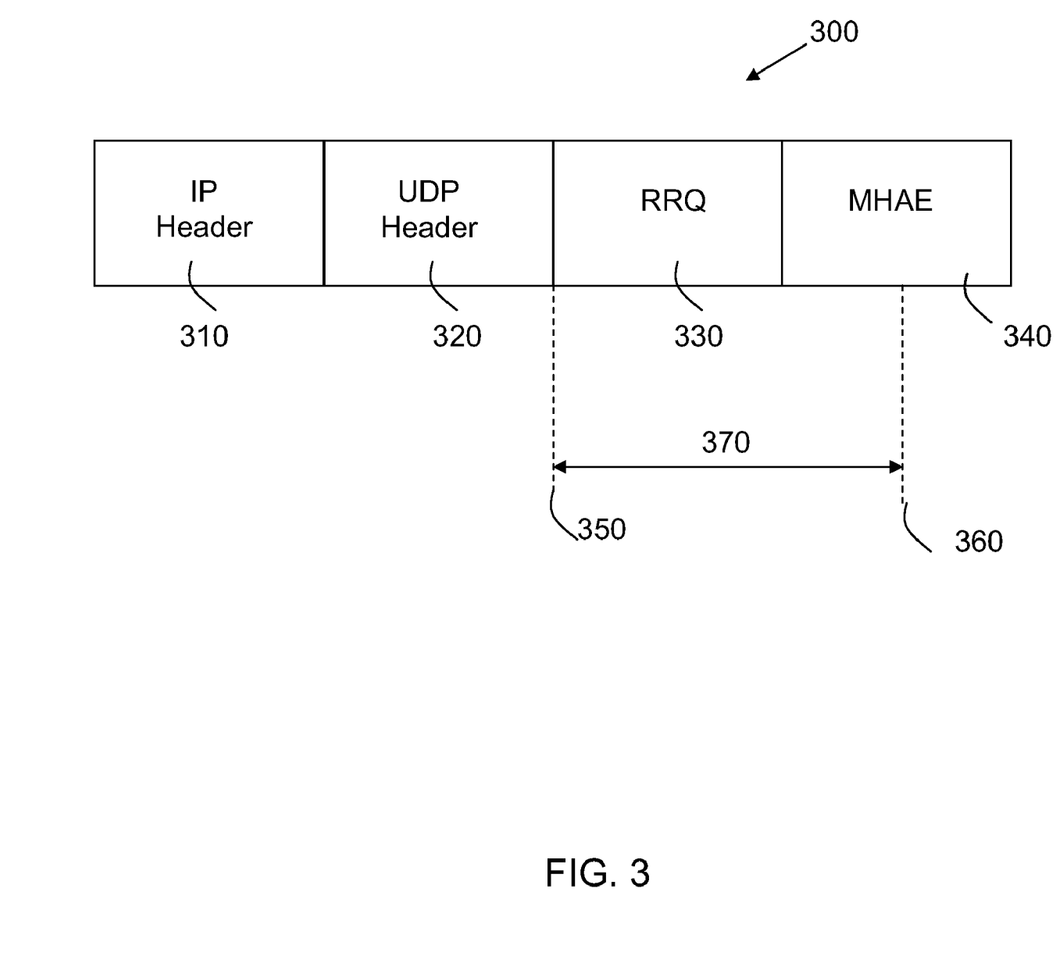
FIG. 3 shows the structure of a Mobile IPv4 IP packet transporting a registration request message.

The following is a brief explanation of the RRQ message used in Mobile IPv4. In Mobile IPv4, the Home Agent responds to the RRQ by sending a response message to the Mobile Node called a 'Registration Reply' (RRP). FIG. 3 shows the format for an IP packet 300 that transports the 'Registration Request' message from the Mobile Node to the Home Agent. The Mobile Node can send the RRQ messages directly to the Home Agent or send them through a Foreign Agent, which will then forward them to the Home Agent.

The IP Packet 300 has an IP 310 header that uses as its source address the IP address from the Mobile Node network interface that is sending the message. In other words, it uses the CoA address. The IP header destination address is usually the Home Agent's IP address or the Foreign Agent's IP address.

The Mobile IPv4 messages exchanged by the Mobile Node and the Home Agent are sent using a UDP (User Datagram Protocol). FIG. 3 shows the UDP 320 header.

After the UDP 320 header comes the Registration Request or RRQ 330, and after that there is a data block called a 'Mobile Node-to-Home Agent Authentication Extension', or MHAE 340, which protects the RRQ data and a part of the MHAE extension data itself. The protected data zone is indicated by line 370.

Figure 4:
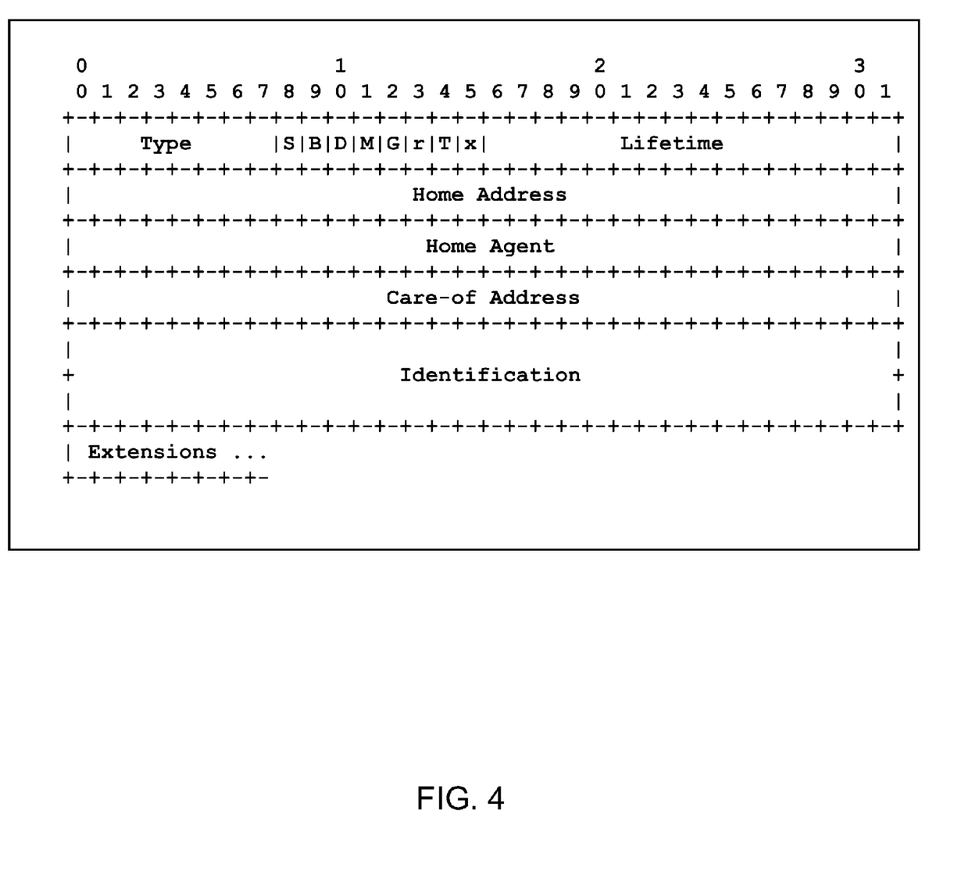
FIG. 4 shows the fields found in a Mobile IPv4 registration request message.

FIG. 4, extracted from RFC 3344, shows a detailed view of the RRQ message fields, and even though a detailed explanation is found in section 3.3 of the same RFC, some of the fields are briefly explained below.

The "Home Address" field is the Mobile Node's permanent IP address, the "Home Agent" field is the Home Agent's IP address and the "Care-of-Address"

field is the CoA IP address that the Mobile Node wants to register with the Home Agent.

There is also a field called "Lifetime" which indicates the number of seconds remaining before the registration is terminated. As a result, the Mobile Node must send regular RRQ messages to the Home Agent in order to stay registered. A value of 0 in the Lifetime field means that the Mobile Node wishes to disconnect (i.e., no longer be registered).

The field "Identification" is a field that changes each time a message is sent. It allows each RRQ message to be associated with its RRP response and avoids security attacks known as 'Replay attacks'.

Figure 5:
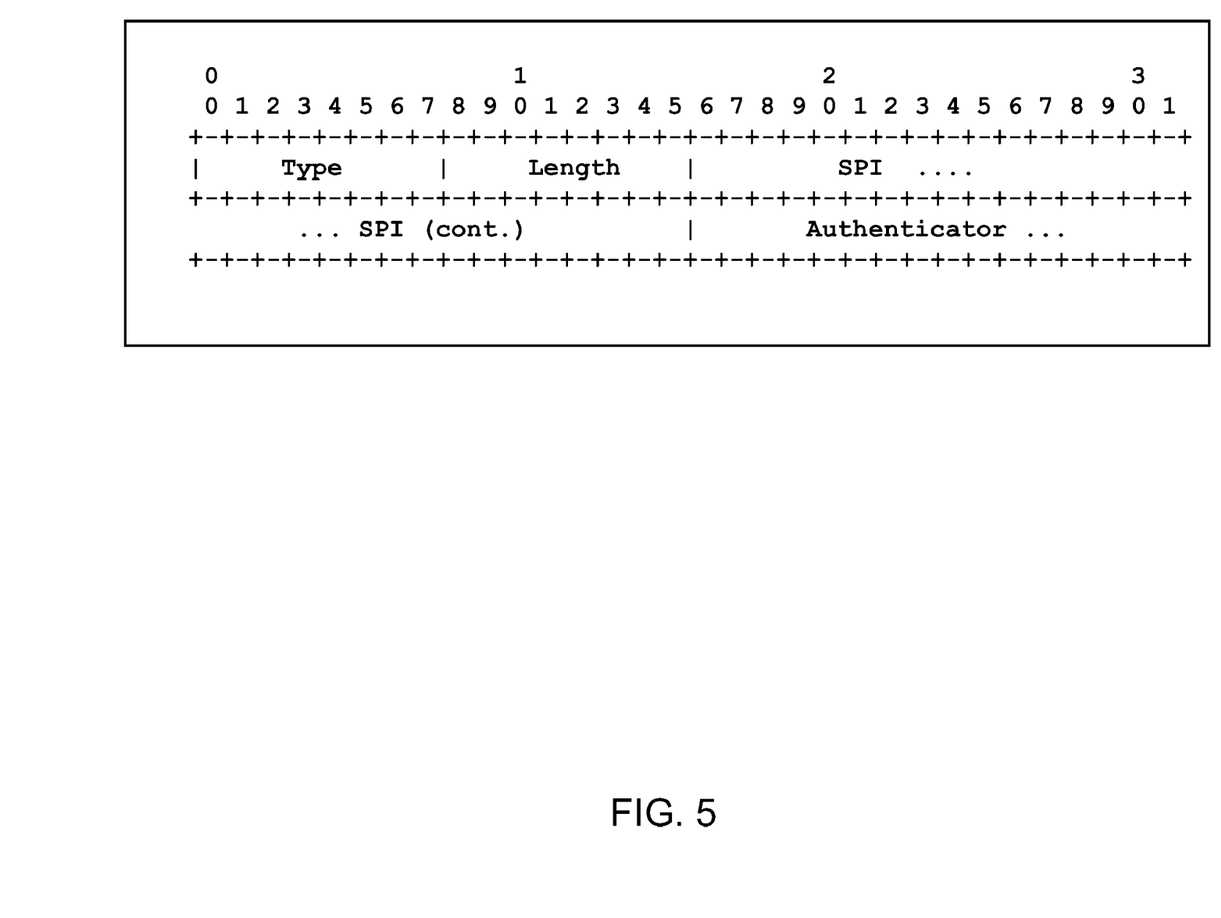
FIG. 5 shows an example of the fields seen in an authentication extension.

FIG. 5, extracted from section 3.5.2 of RFC 3344, shows the MHAE extension format that is added to the RRQ message for added security. The "SPI" or 'Security Parameter Index' field shows the MSA (Mobility Security Association) that the Home Agent and Mobile Node share.

The "Authenticator" field serves to protect the RRQ message data. This field is calculated using a security algorithm applied to the IP packet data, starting just after the UDP header and ending just before the actual Authenticator field. Section 3.5.1 of RFC 3344 explains in detail how the Authenticator field is calculated.

Thanks to the Authenticator field and the MSA shared by the Mobile Node and Home Agent, when the Mobile Node and the Home Agent exchange messages, they can confirm their integrity and where they came from in a secure manner.

Section 3.2 of RFC 3344 states that the RRQ messages and the Authentication Reply must obligatorily include the MHAE security extension. As a result, the Mobile Node 260 in FIG. 2 cannot send the RRQ message until it establishes an MSA2 with the Home Agent. In other words, the Mobile Node must first establish a new MSA2 with the Home Agent, and once it obtains the new MSA2, the Mobile Node can initiate the CoA2 address registration process.

The Mobile Node and the Home Agent can use different mechanisms to establish an MSA like, for example using the Internet Key Exchange protocols, such as IKEv1 or IKEv2. They can also create the MSA using an AAA infrastructure, as described in RFC 3957, titled, "Authentication, Authorization and Accounting (AAA) Registration Keys for Mobile IPv4," by C. Perkins, et al., March of 2005, available online at http://www.ietf.org/rfc/rfc3957.txt.

As a result, when the Mobile Node carries out the handover process and changes from one router to another, it must first obtain a new MSA2 with the new CoA2 address. Next, it registers the new CoA2 with the Home Agent, sends a registration message to the Home Agent and then waits for a response message from the Home Agent to confirm that the registration occurred correctly. It is only when the Mobile Node has completed all these steps that it begins to send IP packets to other nodes (e.g., Correspondent Nodes) in the network using the CoA2 address. This process generates a level 3 latency (i.e. data network level) which is associated with the same processes that the present invention reduces or eliminates completely.

In order to reduce or eliminate the latency associated with the process of registering a new Mobile Node CoA address and the establishment of the new MSA2, all without affecting security, the present invention modifies various features of the Mobile IP protocols. These modifications are explained below.

In one embodiment, a feature of the Mobile IP protocols that the present invention modifies is the requirement of the Mobile Node to register a new CoA or CCoA address with the Home Agent before starting to use the new address. As explained previously, the Home Agent needs to know what Home Address is associated with the IP packets that the Mobile Node sends from the new CoA2 address and it also needs to know to what CoA address it should send the packets arriving at the Home Agent, which are addressed to the Mobile Node. This feature is also found in the IPv6 protocol when the communication between the Mobile Node and the Correspondent Node are made using a process called 'Route Optimization', which permits the Mobile Node the option of sending the IP packets directly to the Correspondent Node without these IP packets passing through the Home Agent. In this case, the Mobile Node must register the new CoA2 with the Correspondent Node and wait for a response from the Correspondent Node.

In another embodiment, a feature of the Mobile IP protocols that is modified is the process for registering the Mobile Node with the new router (e.g., NAR) which is considered a petition for authorization by the Mobile Node to obtain access to the network through the new router. For the registration process is first necessary to establish a new MSA2 (Mobility Security Association) between the Mobile Node and the Home Agent taking into account the new CoA2 to be used by the Mobile Node. This results in an increase in the latency of the CoA2 registration process since the Mobile Node cannot send the registration message to the Home Agent from the new CoA2 address until it has the new MSA2 associated with the new CoA2 address it wants to use.

If, in addition, a remote AAA server is used to authenticate a Mobile Node that wants to connect to a router, the Home Agent must wait until it gets a response from the AAA server before authorizing the Mobile Node to connect. For example, the AAA server can be in charge of establishing the new MSA between the Home Agent and the Mobile Node. This causes an increase in the latency experienced during the handover.

This registration process also affects Route Optimization, the direct communications between the Mobile Node and the Correspondent Node in the Mobile IPv6 protocol. When the Mobile Node and the Correspondent Node communicate directly without sending the IP packets through the Home Agent, both use a security procedure called a 'Return Routability procedure', described in section 5.2 of RFC 3775, to establish a secret key called a Kbm. Even though this key is not called a 'Mobility Security Association', it provides security by safeguarding the communications between the Mobile Node and Correspondent Node.

Section 11.3.1, titled, "Sending Packets While Away from Home" of RFC 3775, explains that if a Mobile Node wants to send packets to a Correspondent Node with which it has not established a registration or "binding" process, the Mobile Node must send the packets through the Home Agent. In other words, the 'binding' process is needed so that the Mobile Node can send the packets directly to the Correspondent Node. During this binding process, a security mechanism called 'Return Routability' is used, which also causes a level 3 delay.

The present invention modifies one or both of these two Mobile IP protocol features for a limited amount of time (e.g., 60 seconds). During this limited period of time, which we will call the 'Provisional Authorization Time', the Mobile Node can send IP packets using the new CoA2 address from the new router NAR 230, even though it has not completed either the CoA2 address registration process or obtained the new MSA2.

In accordance with the present invention, the process of obtaining the new MSA2 and/or registering the new CoA2 with either the Home Agent or the Correspondent Node is completed during the 'Provisional Authorization Time'. During this time the Mobile Node is already sending IP packets using the CoA2 address. In this manner, for IP packets sent by the Mobile Node, the present invention is able to reduce or preferably completely eliminate the latency caused by the process of registering the new IP address to be used by the Mobile node on the Home Agent (or Correspondent Node), as well as the latency associated with the registration request authentication and the latency associated with waiting for the response to the registration request received by the Mobile Node.

Since the Mobile Node sends IP packets using the CoA2 source address before it has obtained the MSA2 and registered the new CoA2, three problems are generated during the Provisional Authorization Time concerning communication with the Mobile Node, independent of whether they are communicating through the Home Agent or communicating directly with the Correspondent Node. These problems and the solution the present invention provides are described below.

A first problem is that the Home Agent receiving the IP packets sent by the Mobile Node with the new CoA2 does not have an entry in its registration table that indicates which Home Address corresponds to the new CoA2. As a result, it is necessary to establish a mechanism that identifies which Home Address is associated with the CoA2 or, in other words, which Mobile Node is sending the IP packets from the non-registered CoA2 address.

A second problem is related to security. The node receiving the IP packets sent by the Mobile Node during the Provisional Authorization Time must check, in a secure manner, that the IP packets really are coming from the Mobile Node 260 as well as check the integrity of the data packets, even though the MSA2 security association has not yet been established between the Mobile Node and Home Agent for communications taking place through the Home Agent.

These problems which affect the Mobile IPv4 and Mobile IPv6 protocols when the Mobile Node communicates through the Home Agent, are also seen in the Mobile IPv6 protocol when there is direct communication between the Mobile and Correspondent Node. Unless the Kbm2 secret key is established using the 'Return Routability' procedure, the Mobile and Correspondent Nodes cannot exchange secure messages. In addition, the Correspondent Node will not know which Home Address corresponds to the IP packets it receives that do not have a registered CoA2 source address.

A third problem that the present invention solves is that the Home Agent does not know to which CoA address it should send the IP packets that are addressed to the Mobile Node while the Mobile Node has not yet registered the new CoA2 address. The same thing happens in Mobile IPv6 with the packets the Correspondent Node sends directly to the Mobile Node.

The present invention solves the first problem by including a Mobile Node identifier in the IP packets sent during the Provisional Authorization Time. The present invention can use any piece of data as the Mobile Node identifier that allows the node that receives the IP packet to uniquely identify the Mobile Node sending the IP packet.

For example, in alternative preferred embodiments the present invention uses the Home Address, a Network Access Identifier-type field or the 64 least significant bits in the IPv6 CoA2 address, called the 'Interface Identifier', as the Mobile Node identifier when these 64 bits are the same among the different IP addresses used by the Mobile Node. These identifiers are explained in greater detail below. The present invention can also use any other identifier that identifies the Mobile Node.

FIG. 6 illustrates how, in one embodiment, the present invention solves the second problem related to security. The IP packets that the Mobile Node 660 sends from the new CoA2 address during the Provisional Authorization Time are authenticated using the MSA1 670 that the Mobile Node used with the previous CoA1 address (labeled 170 in FIG. 1). In this manner, the Mobile Node can authenticate the IP packets it sends to the Home Agent during the Provisional Authorization Time, when the Mobile Node 660 is connected to the router 630 and is using the new CoA2 address and still does not have the new MSA2.

In a similar manner, if the Mobile Node 660 communicates directly with the Correspondent Node 650 using a procedure called 'Route Optimization', the Mobile Node can use the previous Binding Management Key (Kbm1 680) during the Provisional Authorization Time. This Binding Management Key was used before to communicate with the Correspondent Node and was obtained from the CoA1 address using the 'Return Routability' security procedure.

In the embodiment of FIG. 6, Mobile Node 660 uses the old MSA1, which still permits it to send authenticated packets to the Home Agent 610. The MSA1 security association is indicated using a dotted line (670) and joins the Home Agent to the Mobile Node.

In standard Mobile IP protocols, the registration process is equivalent to an authorization process needed to use a network resource, (e.g., the new CoA2 address on router 630). For this reason, in standard Mobile IP protocols, the Mobile Node must use a new MSA2 with the router 630 even though it already had a secure medium on which to communicate with the Home Agent with the old MSA1.

Nevertheless, it is not necessary that the authorization process that allows the Mobile Node 660 to use the new CoA2 address be completed during the registration process, as established in the Mobile IP protocols described in RFC 3344 and RFC 3375. For example, there are different authentication protocols that work at the data link or level 2 layers and it is possible for the Mobile Node, even though it has not obtained the CoA2 address yet, to have completed an authentication process to access the router 630 resources using a level 2 authentication mechanism.

One example of an authentication protocol that can operate at the level 2 or data link layers is the Extensible Authentication Protocol (EAP) described in the RFC 3748 specifications, B. Aboba et al., June of 2004, currently available online at http://www.ietf.org/rfc/rfc3748.txt.

The EAP protocol was initially developed to work together with the PPP protocol (Point to Point Protocol) to authenticate access to a data network from a modem. Since the initial development of the EAP protocol, it has been expanded in such a way that EAP is currently a general use authentication protocol that can be used in many different ways.

As a result, in accordance with one aspect of the present invention, it is not necessary for the Mobile Node to obtain a new MSA2 before using the router NAR 630 or before being able to send IP packets (e.g., an IP packet containing the registration message for the new CoA2 address), as is specified in the Mobile IP protocols.

In this manner, use of the MSA1 or the Kbm1 to authenticate the packets sent by the Mobile Node during the Provisional Authorization Time solves the second security problem, mentioned previously.

Returning to FIG. 6, router 630 could also be a router that does not require user authentication, like an open-access WiFi router, often called a "hot spot," and an authentication process is not required to use the IP address obtained from the router, since use is free for all the users that choose to connect to it.

Regarding the third problem, which prevents the Home Agent from sending IP packets addressed to a non-registered Home Address, the problem is solved in one embodiment of the present invention by including in the IP packets the Mobile Node sends via the Home Agent during the Provisional Authorization Time identification information of the Mobile Node (e.g., the Home Address).

This way, the Home Agent can associate the new CoA2 address with the permanent Home Address and can start to send IP packets addressed to the Mobile Node at the new CoA2 address, while the Mobile Node completes the registration process for the new CoA2.

To do this, the Home Agent detects that an identifier is included with the IP packets received from the Mobile Node's CoA2 source IP address (e.g., the Home Address). In addition, the Mobile Node can include an authentication with the packets that ensures that it really is that Mobile Node that is now using that CoA2 address. To do this, the Mobile Node can also use the MSA1 to authenticate or encrypt the IP packets it sends while obtaining the MSA2. In this way, the latency associated with the IP packets received by the Mobile Node from the Home Agent is reduced or preferably eliminated.

This same solution is also effective when the Correspondent Node 650 wants to send IP packets directly to the Mobile Node 660 and the Mobile Node still has not registered the new CoA2 address with the Correspondent Node 650. If the Correspondent node receives an IP packet from the CoA2 address that includes the Home Address, the Correspondent Node can associate this Home Address with the new CoA2 address and start to send IP packets to the Mobile Node during the Provisional Authorization Time.

For increased security during this process, if the Provisional Authorization Time expires and the Mobile Node has not correctly registered the new CoA2 address with the Home Agent, the latter can stop transmitting packets coming from or addressed to the Mobile Node until the Mobile Node has completed the registration process for the new CoA2. This security mechanism also applies to the IP packets that the Correspondent Node sends directly to the Mobile Node.

Alternatively, the data packets that the Mobile Node sends and receives from either the Home Agent or the Correspondent Node can be encrypted using the MSA1 and Kbm1 security associations, respectively.

Figure 7:
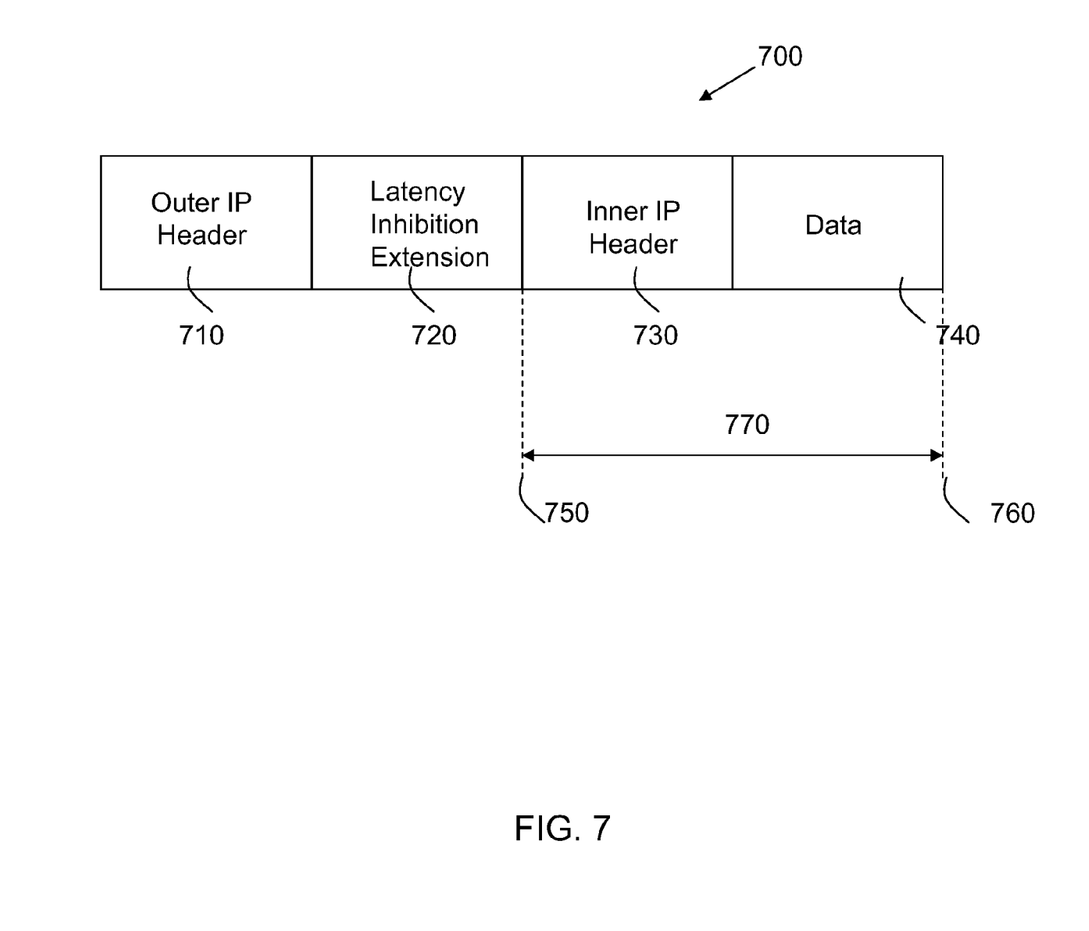
FIG. 7 illustrates an example of an IP packet encapsulated in another IP packet for use in an embodiment of the present invention.

FIG. 7 shows one way of implementing the present invention, in which the IP packets sent by the Mobile Node during the Provisional Authorization Time are encapsulated within another IP packet 700, which includes a new IP header 710, a data block called a 'Latency Inhibition Extension' 720 and the original IP packet, made up of an IP header 730 and the data block 740.

During the Provisional Authorization Time, when the Mobile Node wants to send an IP packet containing an IP header 730 and a data block 740 to the Correspondent Node, the Mobile Node simply encapsulates the IP packet that includes 730 and 740 in a new IP packet 700. The new IP packet 700 includes the new header 710 and the data block 720, called the Latency Inhibition Extension.

Figure 8:
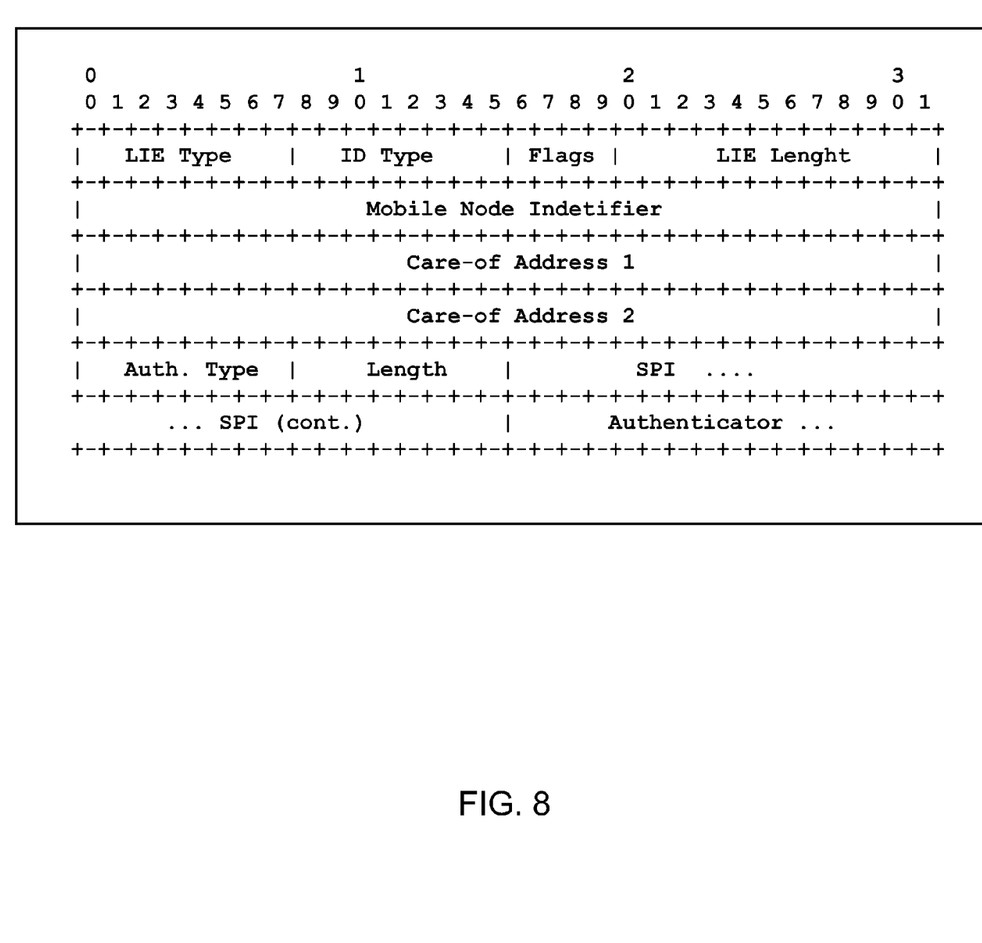
FIG. 8 shows an example of fields in the data block labeled "Latency Inhibition Extension" in one embodiment of the present invention.

FIG. 8 shows one possible configuration of the 'Latency Inhibition Extension' (LIE) data block. This data block has a field called "LIE Type" which indicates whether the data block can be used to implement the present invention and what kind of data are included. It can indicate, for example, whether the IP addresses it has are 32-bit IPv4 addresses or 128-bit IPv6 addresses, or some combination of both IPv4 and IPv6 addresses.

The use of combined IPv4 and IPv6 addresses is useful in Mobile IP protocols because mobile network technologies, like 3GPP, 3GPP2 and IMS (IP Multimedia Subsystem), tend to use IPv6-type addresses. On the other hand, fixed internet networks currently usually use IPv4-type addresses. The document, "Mobile IPv6 support for dual stack Host and Routers" (DSMIPv6), Hesham Soliman, November of 2007, currently available online at http://tools.ietf.org/html/draftietf-mip6-nemo-v4traversal-06, provides an example of how to combine IPv4 and IPv6 address use in Mobile IP protocols.

FIG. 8 shows 32-bit IP addresses, but other types of addresses can also be used with the present invention, as a result of the "LIE Type" field.

The "LIE Length" field indicates how many bytes there are in the LIE 720 data block.

The "Mobile Node Identifier" field is a unique Mobile Node identifier. FIG. 8 shows this field as having a length of 32 bits, but other lengths are also possible. This field can contain any identifier that allows for the unique identification of the Mobile Node even if the Mobile Node changes routers and CoA addresses. For example, the permanent Mobile Node IP address, or Home Address, can be used as an identifier.

Another possible identifier is the Network Access Identifier (NAI) described in the RFC 4282 specifications, B. Aboba et al., December of 2005, available online at http://www.ietf.org/rfc/rfc4282.txt.

Another possible identifier, which can be used when the CoA is of the type IPv6 is the part of the IPv6 address called the Interface Identifier (or Interface ID) which is usually the last 64 of the 128 bits that make up IPv6 addresses. However, an Interface ID length of 64 bits is not obligatory, and IPv6 protocols may in fact vary this in the future. The Interface ID is a unique Mobile Node identifier since this part of the CoA address does not vary when the Mobile Node changes its CoA address when it moves from one router to another. This occurs, for example, if the Mobile Node configures its IP address using the 'IPv6 Stateless Address Autoconfiguration' protocol, described in the RFC 4862 specifications, S. Thomson, et al. September of 2007, currently available online at http://www.ietf.org/rfc/rfc4862.txt.

Other identifiers are also possible. The "ID Type" field is used to determine what type of identifier the Mobile Node is using, and can be made up of, for example, the following values:

| ID Type | Type of identifier |
| --- | --- |
| 1 | IPv4 Home Address |
| 2 | IPv6 Home Address |
| 3 | Network Access Identifier (NAI) |
| 4 | Interface ID |

The "Care-of-Address 1" field in FIG. 8 shows what CoA1 address the router used when previously connected to the PAR router.

The "Care-of-Address 2" field shows the new CoA2 address that the Mobile Node is using to send IP packets from the NAR router.

The following fields, "Auth. Type", "Length", "SPI," and "Authenticator" are types of authentications that the MSA1 uses and that protect the part of the IP packet 700 shown in line 770 (i.e., the original IP packet before encapsulation).

FIGS. 7 and 8 are examples of how the Mobile Node may send IP packets during the Provisional Authorization Time by including an identifier in the IP packets and authenticating the information it sends using the MSA1.

However, there are other possible ways for the Mobile Node to send IP packets during the Provisional Authorization Time. One way includes adding Mobile Node identifiers to the IP packets and authenticating the IP packets using the MSA1 without including a data block like the Latency Inhibition Extension previously described. Including a Mobile Node identifier with the IP packets permits the Home Agent or Correspondent Node to detect which Mobile Node is sending the packet.

If the identifier being used is the Interface ID explained previously, it is not necessary to add this information to the IP packet, because this information is already in the "Source Address" field in the source IP header for all the IP packets the Mobile Node sends from any router.

To authenticate the IP packets using MSA1 during the Provisional Authorization Time, the Mobile Node can use any authentication protocol, like the IP Authentication Header described in the RFC 4302 specifications, S. Kent, December of 2005, currently available online at http://www.ietf.org/rfc/rfc4302.txt. Another authentication protocol that is particularly well-suited for use by the Mobile Node is the "Authentication protocol for Mobile IPv6" protocol, described in the RFC 4285 specifications mentioned previously.

On some network nodes, the IP packets that a network node sends can be modified by an intermediate device on the network. For example, this occurs in the protocol titled, "Traditional IP Network Address Translator" described in the RFC 3022 specifications, P. Srisuresh et al., January of 2001, currently available online at www.ietf.org/rfc/rfc3022.txt.

In this case, when the Home Agent receives the modified IP packet it cannot validate the authentication because the electronic signature was calculated based on elements 730 and 740 of the original IP packet.

To solve the problem resulting from the modifications made to the IP packet, the "Flags" field in FIG. 8 can be used to include information that refers to or identifies the modified fields. For example, one use for the "Flags" field can be to indicate that the original IP packet, made up of elements 730 and 740 (line 770 in FIG. 7), is modifiable by the data network, for example by the router 630, and may have been modified by the time it arrives at the Home Agent.

In this manner, the Mobile Node can use the "Flags" field in the Latency Inhibition Extension 720 data block to indicate to the Home Agent which IP packet fields will be modified, and authenticate elements 730 and 740 by adding a fixed value (e.g., a zero) to all of the bytes in the IP packet field that will be modified.

For example, suppose that the field to be modified is the source IP address for the original IP packet. This field is found in the Inner IP Header 730 in FIG. 7. If the Mobile Node knows that the field can be modified, then it can calculate the authentication or electronic signature value as if the value in the field were a string of zeros, as well as indicate that it calculated the electronic signature by putting a "1" in the first bit of the "Flags" field, going from left to right (i.e., the first bit immediately after the "ID Type" field).

When the Home Agent receives the IP packet, it detects that the packet's source IP address has been modified due to the fact that the first flag is, for example, a 1. Then, when it checks the IP packet authentication, it completes the calculations and substitutes the IP packet's source address for a string of zeros. In this manner, the Home Agent can confirm that the IP packet has come from the Mobile Node even though the IP packet's source IP address had been modified by the router 630.

Similarly, using other flags, the Mobile Node can notify the Home Agent that other fields in the IP packet are modifiable before arriving at the Home Agent, and the Home Agent can confirm the IP packet's authentication, even though the fields may have been modified.

Using another approach, the present invention can also be used without the Registration Request process (IPv4) and the Binding Update (IPv6), since the information sent in these messages (the new CoA2 address, the Mobile node identification and authentication), has already been included in the IP packets sent during the Provisional Authorization Time by using, for example, the 'Latency Inhibition Extension' data block.

In an exemplary embodiment, the Home Agent can carry out an "implicit" registration process by analyzing the IP packets sent by the Mobile Node during the Provisional Authorization Time, instead of carrying out an "explicit" registration process using the Registration Request messages (IPv4) and Binding Update (IPv6). The Mobile Node can confirm that the "implicit" registration process has been completed successfully when it starts to receive IP packets from the Home Agent addressed to the new CoA2 address, which was registered "implicitly." This also avoids the Registration Replies (IPv4) and Binding Acknowledgement messages.

The Mobile Node can also carry out an "implicit" registration process on the Correspondent Node in a manner similar to that explained in the previous paragraph for the Home Agent.

In this manner, the process of registering the new CoA2 address is carried out automatically, and the Mobile Node can stop sending the Latency Inhibition Extension as soon as it has proof that the Home Agent has completed the automatic registration, in the form of receiving an IP packet addressed to the new CoA2 address. When this happens, the Mobile Node terminates the Provisional Authorization Time.

However, it also has to take into account that the Registration Request and Binding Update messages have a "Lifetime" field which limits the number of seconds during which the registration process is valid. This problem can be solved by, for example, adding a "Lifetime" field to the Latency Inhibition Extension data block, described in FIG. 8, and periodically resending the IP packets containing the Latency Inhibition Extension.

In FIG. 1, elements 111, 121, 131, 141 and 142 identify the network interfaces of the Home Agent 110, PAR 120, NAR 130 and router 140, respectively. Elements 122 and 132 refer to a communication link between antennas 122 and 123 and routers 120 and 130 respectively. In FIG. 2, elements 211, 212, 213, 214, 215, 220, 221, 222, 223, 230, 231, 232, 233, 241 and 242 correspond to elements 111, 112, 113, 114, 115, 120, 121, 122, 123, 130, 131, 132, 133, 141 and 142 of FIG. 1, respectively. In a like manner, in FIG. 6 elements 611, 612, 613, 614, 615, 620, 621, 622, 623, 630, 631, 632, 633, 641 and 642 correspond to elements 111, 112, 113, 114, 115, 120, 121, 122, 123, 130, 131, 132, 133, 141 and 142 of FIG. 1, respectively.

What is claimed is:

1. A method for transmitting packets using a version of IPv4 or IPv6 Mobile IP protocol between a mobile node and a first node in a data network after the mobile node has transmitted data packets to the first node via a first router from a first CoA or CCoA address and by a first security association with the first node, the method comprising:
   the mobile node sending to the first node via a second router using a second CoA or CCoA address data packets that include an identifier of the mobile node that enables the first node to identify the mobile node as the sender of the data packets during an initial time period after transmission of the data packets via the second router has started; and
   during the initial time period, the mobile node authenticating the data packets it transmits to the first node using the first security association with the first node.

2. A method according to claim 1, further comprising the mobile node concurrently registering with the first node the second CoA or CCoA address during the initial time period.

3. A method according to claim 2, further comprising the first node terminating the transmission of data packets to the mobile node if the registration of the second CoA or CCoA address is not completed within the initial time period.

4. A method according to claim 3, further comprising the first node reinitiating transmission of data packets to the mobile node when the registration of the second CoA or CCoA address is completed.

5. A method according to claim 2, further comprising the first node establishing an association between the second CoA or CCoA address and the identifier of the mobile node and storing the association in a memory of the first node.

6. A method according to claim 5, further comprising the first node sending data packets to the second CoA or CCoA address of the mobile node after it has established a relationship between the second CoA or CCoA address and the identifier of the mobile node.

7. A method according to claim 1, further comprising the mobile node concurrently obtaining a new security association with the first node during the initial time period.

8. A method according to claim 1, further comprising the mobile node concurrently registering with the first node the second CoA or CCoA address and obtaining a new security association with the first node during the initial time period.

9. A method according to claim 1, wherein the first node is a Home Agent of the mobile node.

10. A method according to claim 1, wherein the first node is a Correspondent Node of the mobile node.

11. A method according to claim 1, wherein the mobile node identifier is the Home Address of the mobile node.

12. A method according to claim 1, wherein the mobile node identifier is a Network Access Identifier of the mobile node.

13. A method according to claim 1, wherein the mobile node identifier is the Interface Identifier portion of a mobile node IP address.

14. A method according to claim 1, wherein the first security association is a Mobility Security Association.

15. A method according to claim 1, wherein the first security association includes the use of a Binding Management Key.

16. A method according to claim 1, further comprising the use of an authentification protocol that works at the data link or level 2 layers to permit the mobile node to access the second router before the second CoA or CCoA address is authenticated with the second router.

17. A method according to claim 16, wherein the authentification protocol is a version of the Extensible Authentification Protocol.

18. A method according to claim 1, wherein the data packets sent by the mobile node through the second router are encapsulated in IP packets having the same destination IP address as the first node.

19. A method according to claim 18, wherein the first node is a Home Agent, the Home Agent removing the IP packet encapsulation and forwarding the IP packets without the encapsulation to a final packet destination.

20. A method according to claim 1, wherein the data packets sent by the mobile node include a first data field that indicates that a second data field in the data packet is modifiable after being sent by the mobile node, the mobile node authenticating the data packets as if the value of the second data field were a string of zeros.

21. A method according to claim 20, further comprising the first node receiving the data packets and determining from the first data field that the second data field may have been modified and in response the first node authenticating the data packets as if the value of the second data field were a string of zeros.

* * * * *